US012380928B2

(12) United States Patent (10) Patent No.: US 12,380,928 B2
Minami et al. (45) Date of Patent: Aug. 5, 2025

(54) DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hiroshi Minami, Yokohama Kanagawa (JP); Shigeru Juman, Kawasaki Kanagawa (JP); Kouichi Toukairin, Kawasaki Kanagawa (JP); Yasuhiko Kato, Setagaya Tokyo (JP); Hirofumi Kuribara, Chuo Tokyo (JP); Kenji Mizuochi, Kamakura Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 332 days.

(21) Appl. No.: 18/182,719

(22) Filed: Mar. 13, 2023

(65) Prior Publication Data

US 2024/0096377 A1 Mar. 21, 2024

(30) Foreign Application Priority Data

Sep. 20, 2022 (JP) .................................. 2022-148719

(51) Int. Cl.
*G11B 33/02* (2006.01)

(52) U.S. Cl.
CPC .................................. *G11B 33/022* (2013.01)

(58) Field of Classification Search
CPC ...................................................... H05K 5/00
See application file for complete search history.

(56) References Cited

U.S. PATENT DOCUMENTS

| 5,502,604 | A | 3/1996 | Furay |
| 6,574,118 | B1 | 6/2003 | Russell et al. |
| 2016/0314721 | A1* | 10/2016 | Hasegawa ............. G09F 3/0292 |
| 2023/0043293 | A1* | 2/2023 | Yun ....................... H05K 5/0208 |

FOREIGN PATENT DOCUMENTS

JP 3650282 B2 5/2005

\* cited by examiner

*Primary Examiner* — Jerry Wu
(74) *Attorney, Agent, or Firm* — Knobbe, Martens, Olson & Bear, LLP

(57) ABSTRACT

According to one embodiment, a disk device includes a housing, magnetic disks in the housing, and a printed circuit board attached to an outer surface of a bottom wall of the housing. The housing includes a base including a bottom wall and a side wall, and at least two base-side positioning portions provided on the bottom wall in a region overlapping the side wall. The printed circuit board includes at least two board-side positioning portions each engaged with the base-side positioning portion. One of the base-side positioning portion and the board-side positioning portion includes a pin extending substantially perpendicular to the bottom wall, and another includes a hole into which the pin is fitted.

6 Claims, 19 Drawing Sheets

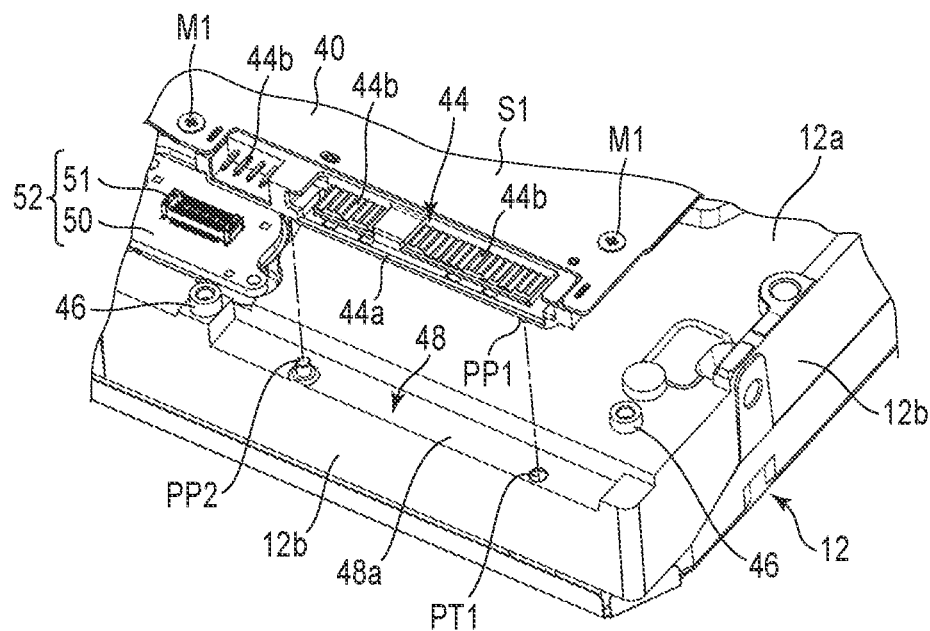
F I G. 14
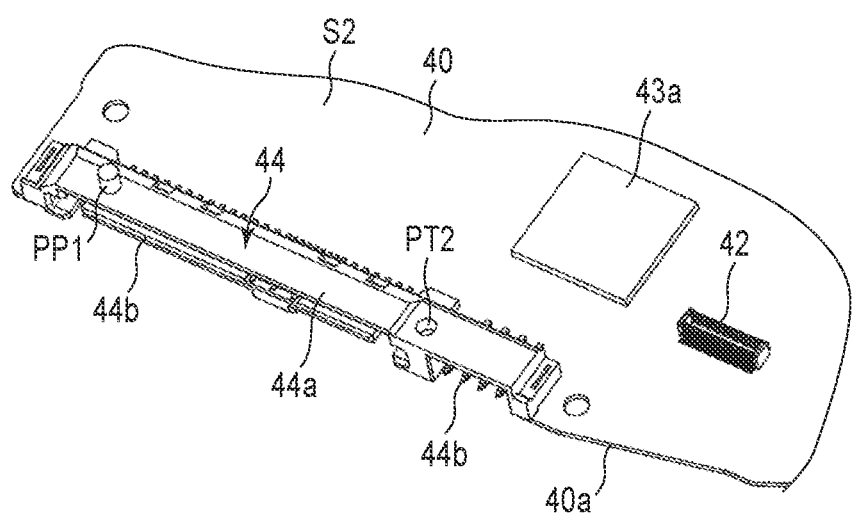
F I G. 15

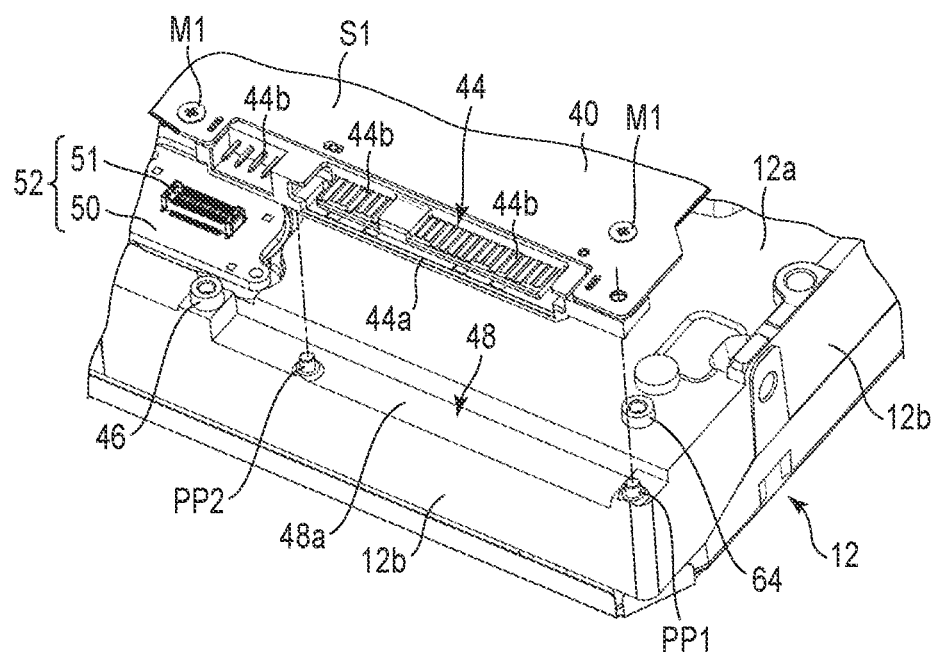
F I G. 26
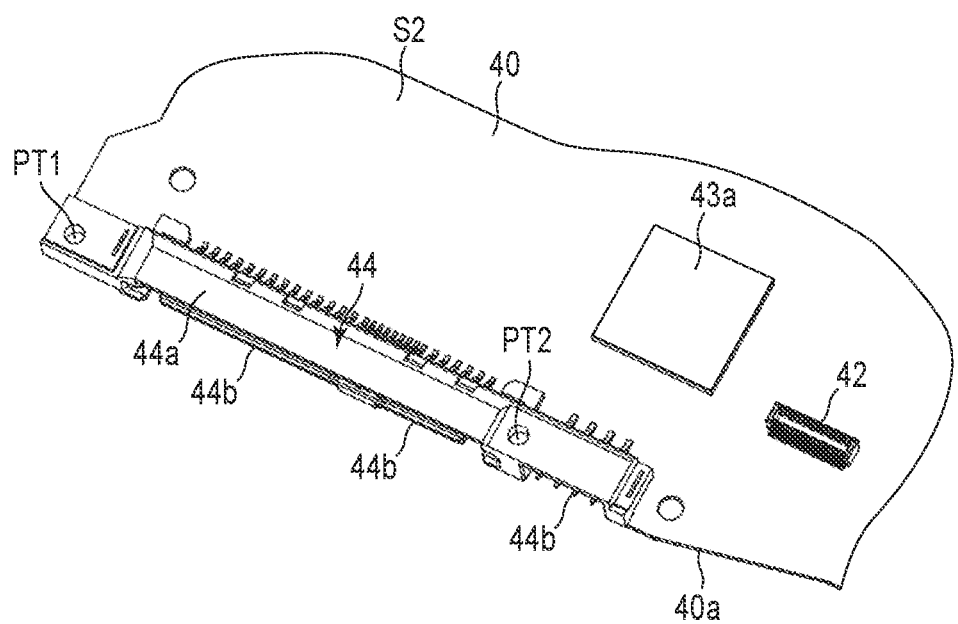
F I G. 27

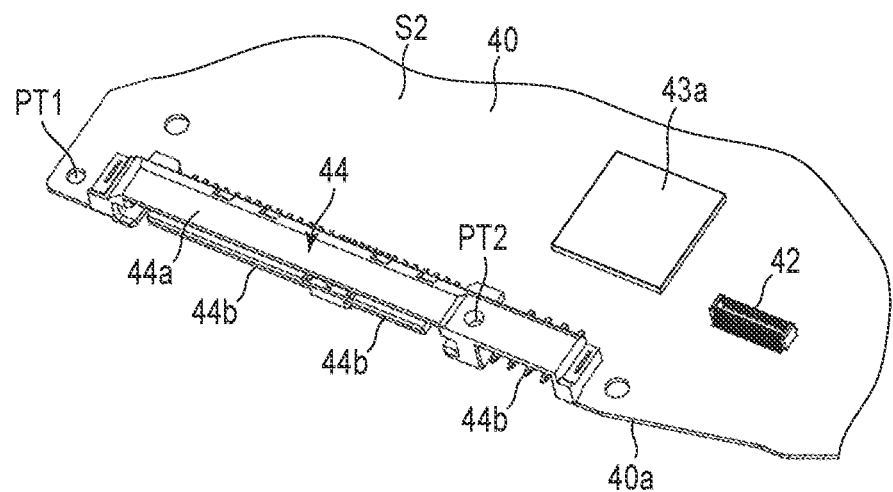
F I G. 30
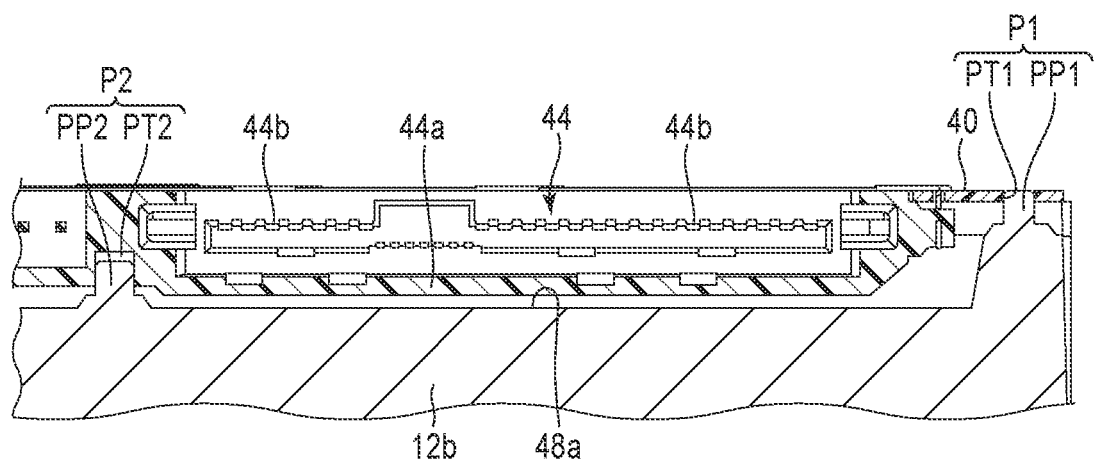
F I G. 31

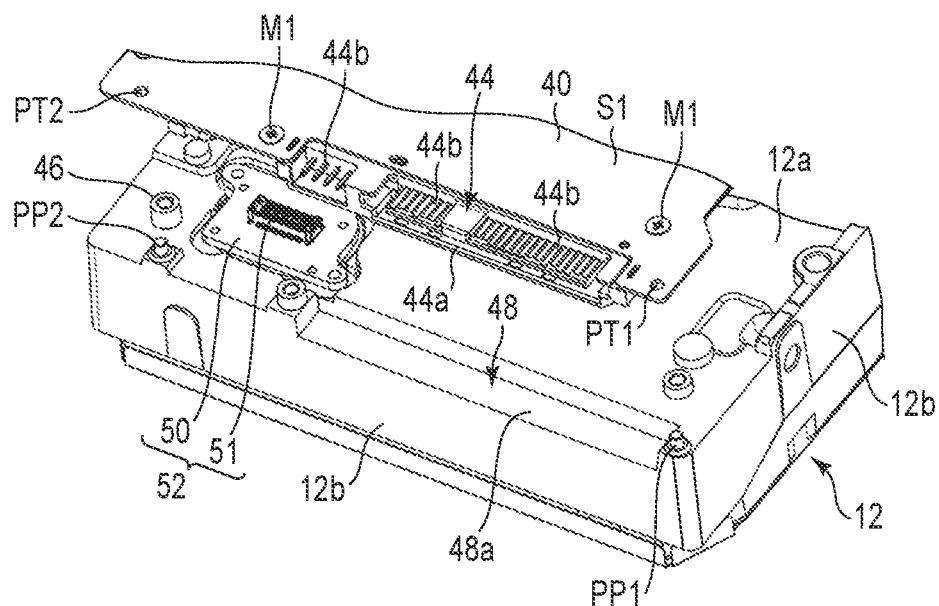
F I G. 32
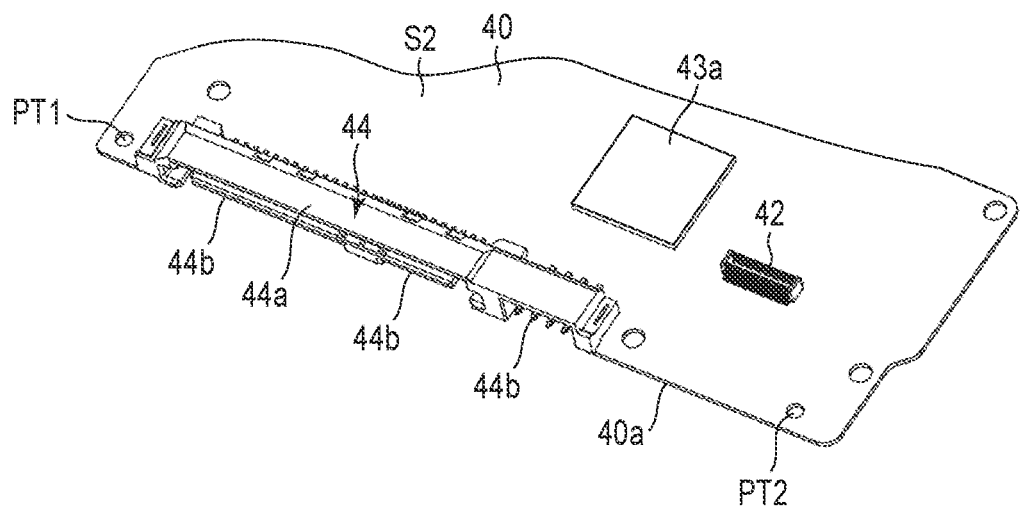
F I G. 33

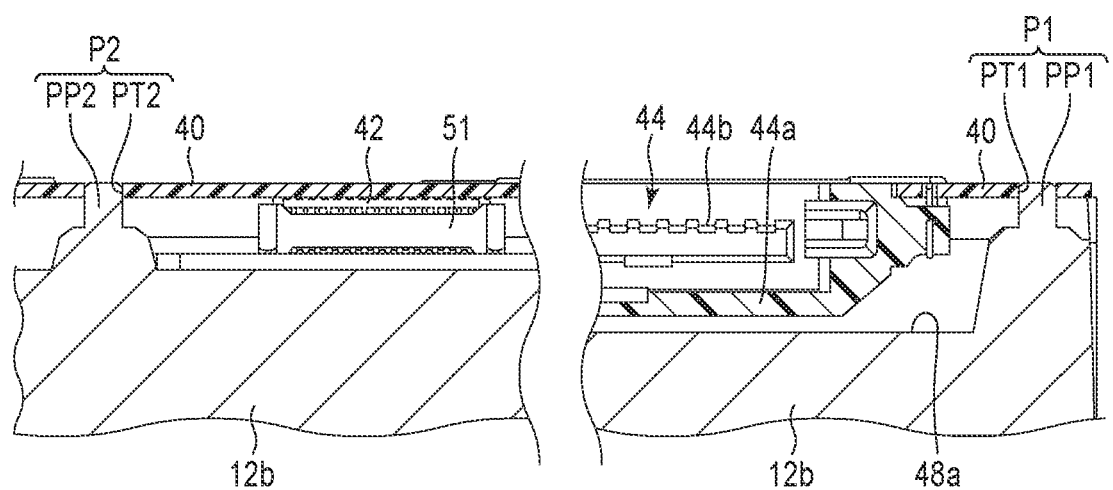
F I G. 34

DISK DEVICE

CROSS-REFERENCE TO RELATED APPLICATIONS

This application is based upon and claims the benefit of priority from Japanese Patent Application No. 2022-148719, filed Sep. 20, 2022, the entire contents of which are incorporated herein by reference.

FIELD

Embodiments described herein relate generally to a disk device.

BACKGROUND

As a disk device, a magnetic disk drive includes a housing having a base and a top cover, and an actuator supporting a magnetic disk and a magnetic head, which are rotatable, is disposed in the housing. As a method for improving the performance of the disk drive, a method has been proposed in which a low-density gas such as helium is sealed in the housing to reduce the rotational resistance of the magnetic disk and the magnetic head.

In such a magnetic disk drive, the top cover is airtightly fixed to the base of the housing to form a hermetically sealed housing, and airtightness in the housing is increased. In order to transmit an electric signal of the magnetic head provided in the housing to a control circuit board provided outside the device, a relay connector penetrating the bottom wall of the housing is provided. The control circuit board is engaged with a positioning boss and the relay connector provided on the bottom wall of the base to be attached to the base in the state of being positioned with respect to the base.

The positioning boss as described above is usually provided at a position overlapping the internal space (gas filling region) of the base in the base bottom wall. In recent years, the number of installed magnetic disks tends to increase, and the wall thickness of the base tends to decrease accordingly. When the positioning boss or the like is processed in such a portion having a thin wall thickness, there is a high risk of causing leakage of low-density gas. In addition, in a case where the relay connector is also used for positioning, it is necessary to increase the attachment accuracy of the relay connector, and it is necessary to increase the processing accuracy of the base. Therefore, there is a possibility that the manufacturability of the disk device including the base is deteriorated.

BRIEF DESCRIPTION OF THE DRAWINGS

FIG. 14 is an exploded perspective view illustrating a back surface side of a base and a control circuit board in the HDD according to a fourth embodiment.

FIG. 15 is a perspective view illustrating an interface connector mounting portion of the control circuit board in the HDD according to the fourth embodiment.

FIG. 26 is an exploded perspective view illustrating a back surface side of a base and a control circuit board in the HDD according to an eighth embodiment.

FIG. 27 is a perspective view illustrating an interface connector mounting portion of the control circuit board in the HDD according to the eighth embodiment.

FIG. 30 is a perspective view illustrating an interface connector mounting portion of the control circuit board in the HDD according to the ninth embodiment.

FIG. 31 is a cross-sectional view of positioning portions of a housing and the control circuit board in the HDD according to the ninth embodiment.

FIG. 32 is an exploded perspective view illustrating a back surface side of a base and a control circuit board in the HDD according to a tenth embodiment.

FIG. 33 is a perspective view illustrating an interface connector mounting portion of the control circuit board in the HDD according to the tenth embodiment.

FIG. 34 is a cross-sectional view of positioning portions of a housing and the control circuit board in the HDD according to the tenth embodiment.

DETAILED DESCRIPTION

Figure 1:
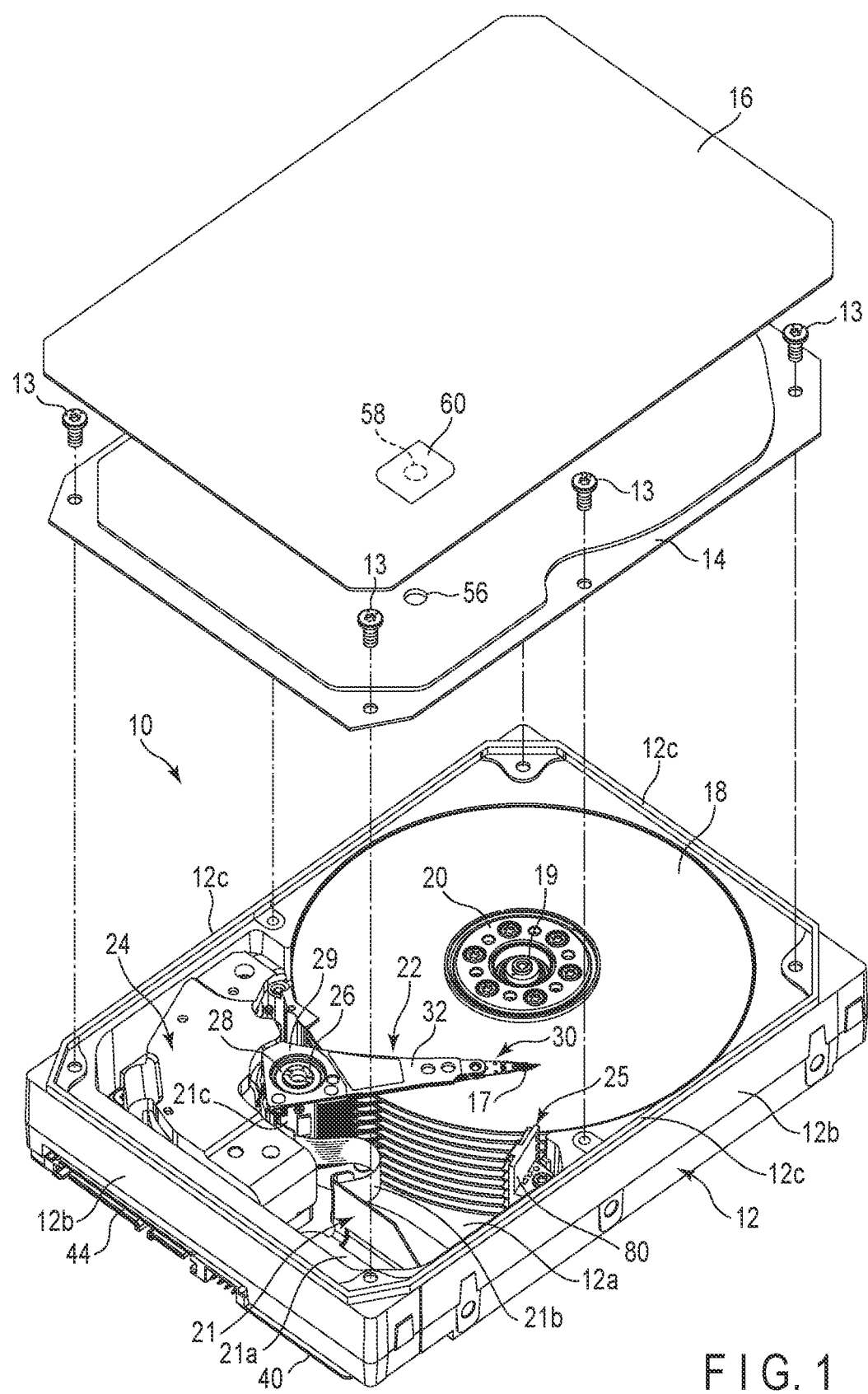
FIG. 1 is an exploded perspective view illustrating an internal structure of a hard disk drive (HDD) according to a first embodiment.

Various embodiments will be described hereinafter with reference to the accompanying drawings. In general, according to one embodiment, a disk device comprises a housing which comprises a base including a bottom wall and a side wall provided upright on a peripheral edge portion of the bottom wall, a lid body fixed to the side wall, and at least two base-side positioning portions provided on the bottom wall in a region overlapping the side wall, and in which a gas having a density lower than that of air is sealed; a plurality of magnetic disks provided in the housing; a motor which supports and rotates the magnetic disks; a plurality of heads which process data on the magnetic disks; and a printed circuit board attached to an outer surface of the bottom wall, configured to control operations of the motor and the heads, and mounted with a plurality of connectors and electronic components. The printed circuit board includes at least two board-side positioning portions each engaged with the base-side positioning portion. One of the base-side positioning portion and the board-side positioning portion includes a pin extending substantially perpendicular to the bottom wall, and another includes a hole into which the pin is fitted.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

FIG. 1 is an exploded perspective view illustrating an internal structure of an HDD according to a first embodiment.

As illustrated in the drawing, the HDD includes a substantially rectangular housing 10. The housing 10 has a rectangular box-shaped base 12 having an open upper surface, an inner cover 14 that is screwed to the base 12 with a plurality of screws 13 to close the upper end opening of the base 12, and an outer cover (top cover) 16 which is arranged so as to overlap the inner cover 14 and has a peripheral edge portion welded to the base 12. The base 12 has a rectangular bottom wall 12a which faces the inner cover 14 with a gap therebetween, and a frame-shaped side wall 12b which is provided upright along the peripheral edge portion of the bottom wall 12a, and, for example, is integrally molded of aluminum. The side wall 12b includes a pair of long side walls facing each other and a pair of short side walls facing each other. A fixing rib 12c having a substantially rectangular frame shape is provided to protrude from the upper end surface of the side wall 12b.

The inner cover 14 is formed of, for example, stainless steel into a rectangular plate shape. The peripheral edge portion of the inner cover 14 is screwed to the upper surface of the side wall 12b of the base 12 with a screw 13, so that the inner cover is fixed to the inside of the fixing rib 12c. The outer cover 16 is formed of aluminum into a rectangular plate shape, for example. The outer cover 16 is formed to have a plane dimension slightly larger than that of the inner cover 14. The peripheral edge portion of the outer cover 16 is welded to the fixing ribs 12c of the base 12 along the entire circumference, so that the outer cover is airtightly fixed. An airtight internal space (gas filling region) AR is defined by the base 12 and the inner cover 14.

Air holes 56 and 58 for the communication of the inside and the outside of the housing 10 are formed in the inner cover 14 and the outer cover 16, respectively. The air in the internal space AR of the housing 10 is exhausted through the air holes 56 and 58, and a low-density gas (inert gas) having a density lower than that of the air, for example, helium is sealed in the internal space AR of the housing 10 through the air holes 56 and 58. For example, a seal (sealing body) 60 is attached to the outer surface of the outer cover 16 to close the air hole 58.

As illustrated in FIG. 1, a plurality of, for example, ten magnetic disks 18 as recording media and a spindle motor 19 as a drive unit for supporting and rotating the magnetic disks 18 are provided in the housing 10. The spindle motor 19 is disposed on the bottom wall 12a. Each magnetic disk 18 is, for example, formed to have a diameter of 95 mm (3.5 inches) and has a magnetic recording layer on the upper surface and/or lower surface thereof. The magnetic disk 18 is coaxially fitted to a hub (not illustrated) of the spindle motor 19, and are further clamped by a clamp spring 20. As a result, each magnetic disk 18 is supported in the state of being positioned in parallel with the bottom wall 12a of the base 12. The magnetic disk 18 is rotated at a predetermined rotation speed by the spindle motor 19. Note that the number of the magnetic disks 18 is not limited to 10, and may be 9 or less or 11 or more.

In the housing 10, a plurality of magnetic heads 17 for recording and reading information on the magnetic disk 18, and an actuator assembly 22 movably supporting the magnetic heads 17 with respect to the magnetic disk 18 are provided. In addition, a voice coil motor (hereinafter referred to as VCM) 24 which rotates and positions the actuator assembly 22, a ramp load mechanism 25 which holds the magnetic head 17 at an unload position apart from the magnetic disk 18 when the magnetic head 17 moves to the outermost periphery of the magnetic disk 18, and a board unit (FPC unit) 21 on which electronic components such as a conversion connector are mounted are provided inside the housing 10. The ramp load mechanism 25 has a lamp 80 provided upright on the base 12.

The actuator assembly 22 includes an actuator block 29 having a through hole, a bearing unit (unit bearing) 28 provided in the through hole, a plurality of, for example, 11 arms 32 extending from the actuator block 29, suspension assemblies (which may be referred to as head gimbal assemblies: HGA) 30 attached to respective arms 32, and magnetic heads 17 supported by the suspension assemblies 30. A support shaft 26 is provided upright on the bottom wall 12a. The actuator block 29 is rotatably supported around the support shaft 26 by the bearing unit 28.

The FPC unit 21 integrally includes a substantially rectangular base portion 21a bent in an L shape, an elongated strip-shaped relay portion 21b extending from one side edge of the base portion 21a, and a joint portion 21c provided continuously to the distal end of the relay portion 21b. The base portion 21a, the relay portion 21b, and the joint portion 21c are formed of a flexible printed wiring board (FPC).

A plurality of electronic components such as a conversion connector and a capacitor to be described later are mounted on the base portion 21a and electrically connected to the wiring of the FPC. The base portion 21a is installed on the bottom wall 12a of the base 12. The relay portion 21b extends from the side edge of the base portion 21a toward the actuator block 29 of the actuator assembly 22. The joint portion 21c provided at the extension end of the relay portion 21b is attached and screwed to be fixed to the side surface (installation surface) of the actuator block 29. A large number of connection pads are provided in the joint portion 21c. Each magnetic head 17 of the actuator assembly 22 is electrically connected to the connection pad of the joint portion 21c through a wiring member (flexure). As a result, the FPC unit 21 is electrically connected to the magnetic head 17 and the voice coil of the VCM 24.

Figure 2:
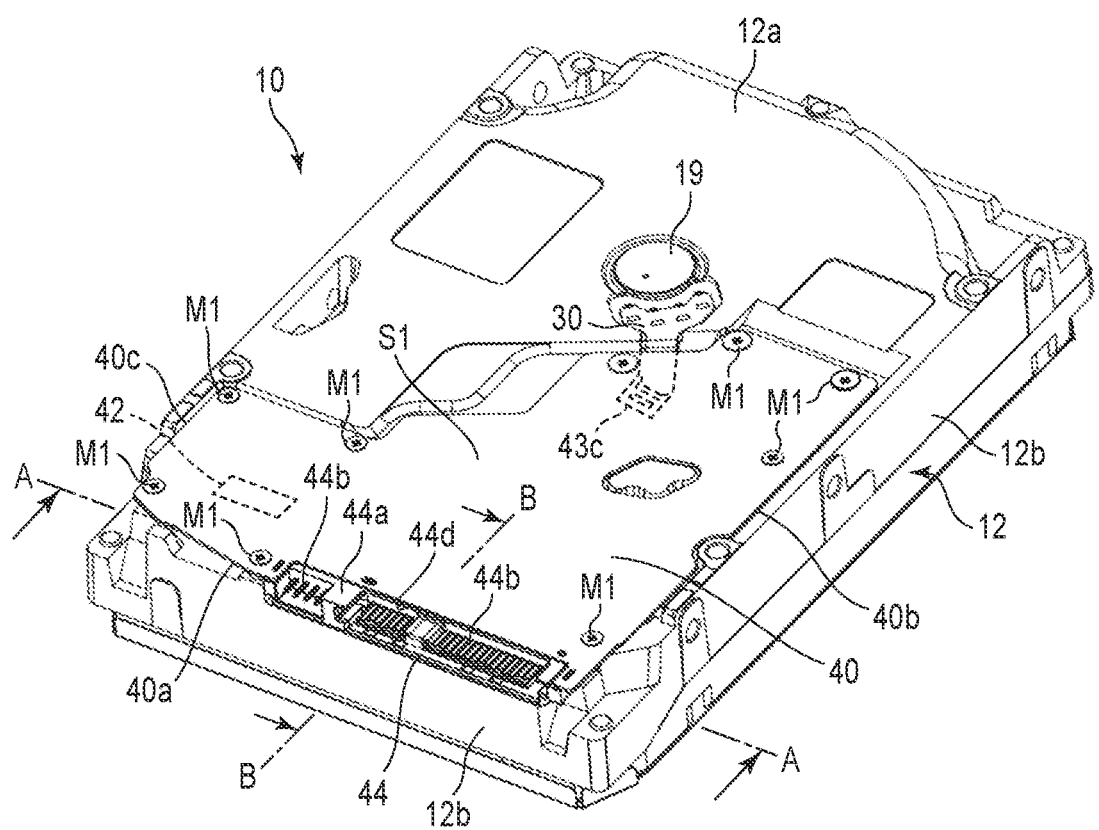
FIG. 2 is a perspective view illustrating a back surface side of the HDD.
Figure 3:
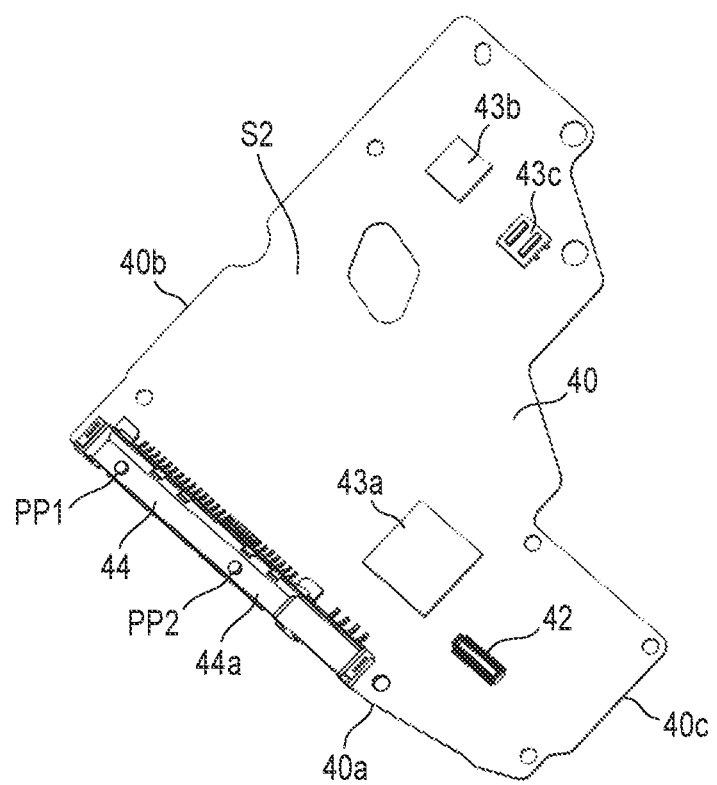
FIG. 3 is a perspective view of a control circuit board of the HDD.

FIG. 2 is a perspective view illustrating the back surface side of the HDD, and FIG. 3 is a perspective view of a printed circuit board (control circuit board, printed circuit board assembly which may be referred to as PCBA).

As illustrated in FIG. 2, a printed circuit board 40 is installed on the outer surface of the bottom wall 12a of the base 12, and is screwed and fixed to the bottom wall 12a. The printed circuit board 40 has an end side 40a positioned substantially aligned with one short side (a short side apart from the magnetic disk 18) of the bottom wall 12a, and a pair of side sides 40b and 40c extending substantially orthogonal to the end side 40a and positioned substantially aligned with a pair of long sides of the bottom wall 12a. The printed circuit board 40 has an outer surface S1 exposed to the outside and an opposite inner surface S2. The printed circuit board 40 is attached to the base 12 in a state where the inner surface S2 faces the bottom wall 12a.

As illustrated in FIG. 3, for example, an interface connector 44 connected to an external device, a relay connector 42 connected to a connector on the base 12 side, drive ICs 43a and 43b, a connector terminal portion 43c connected to the spindle motor 19, and a plurality of other electronic components (not illustrated) are mounted on the inner surface S2 of the printed circuit board 40. The printed circuit board 40 configures a control circuit board which controls the operation of the spindle motor 19 and controls the operations of the VCM 24 and the magnetic head 17 through the FPC unit 21.

As illustrated in FIGS. 2 and 3, the printed circuit board 40 has an elongated rectangular notch (recess) 44d formed on the side of the end side 40a. The long side of the notch 44d extends substantially parallel with the side of the end side 40a. The interface connector 44 is mounted on the printed circuit board 40 along the end side 40a, and the most thereof faces the notch 44d. The interface connector 44 includes an elongated rectangular case 44a formed of synthetic resin, for example, and a large number of connection terminals 44b arranged side by side in the case 44a. The case 44a is fixed to the inner surface S2 and covers the notch 44d. The connection terminal 44b is exposed to the side of the notch 44d and the end side 40a of the printed circuit board 40. In this embodiment, a first positioning pin PP1 and a second positioning pin PP2 are provided to protrude from the case 44a. The first positioning pin PP1 and the second positioning pin PP2 are provided to be separated from each other in the longitudinal direction of the end side 40a, and extend in a direction substantially perpendicular to the inner surface S2 of the printed circuit board 40.

The relay connector 42 is mounted on the inner surface S2 in the vicinity of the interface connector 44. The relay connector 42 is configured by, for example, a stacking connector standing substantially vertically from the inner surface S2. The relay connector 42 is connected to a relay connector 51 to be described later provided on the side of the bottom wall 12a.

A drive IC 42b and the connector terminal portion 43c are mounted on the end portion opposite to the end side 40a. The connector terminal portion 43c is connected to one end portion of a connection FPC 30 attached to the bottom wall 12a. The other end of the connection FPC 30 is electrically connected to the spindle motor 19. As a result, the printed circuit board 40 is electrically connected to the spindle motor 19 through the connector terminal portion 43c and the connection FPC 30.

Figure 4:
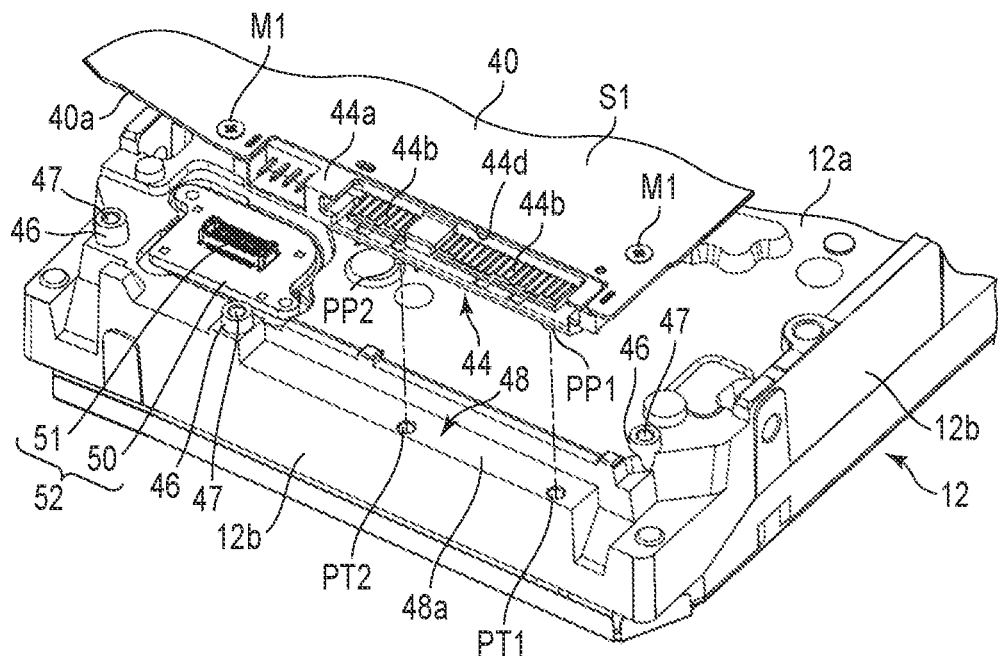
FIG. 4 is an exploded perspective view illustrating a back surface side of a base and the control circuit board.

FIG. 4 is an exploded perspective view illustrating the back surface side of the base and the printed circuit board.

As illustrated in the drawing, bosses 46 having a predetermined height are provided to protrude from a plurality of positions on the outer surface of the bottom wall 12a. A screw hole 47 is formed in each boss 46.

In the bottom wall 12a, an elongated rectangular recess 48 is formed in a region overlapping the side wall 12b on the short side. The recess 48 extends in the longitudinal direction of the side wall 12b and is opened to the outer surfaces of the bottom wall 12a and the side wall 12b. The bottom surface 48a of the recess 48 extends substantially parallel with the outer surface of the bottom wall 12a.

The bottom surface 48a is provided with a first positioning hole PT1 and a second positioning hole PT2 as base-side positioning portions. The first positioning hole PT1 and the second positioning hole PT2 are separated from each other in the longitudinal direction of the side wall 12b and extend in a direction substantially perpendicular to the bottom surface 48a.

In the vicinity of the side wall 12b, the relay connector unit 52 is provided on the bottom wall 12a. The relay connector unit 52 includes a relay board 50 fixed to the bottom wall 12a, a first relay connector 51 mounted on the outer surface of the relay board 50, and a second relay connector (not illustrated) mounted on the inner surface of the relay board 50. The first relay connector 51 is exposed to the outer surface of the bottom wall 12a. The second relay connector extends into the base 12 through a through hole formed in the bottom wall 12a, and is electrically connected to the FPC unit 21 described above.

Figure 5:
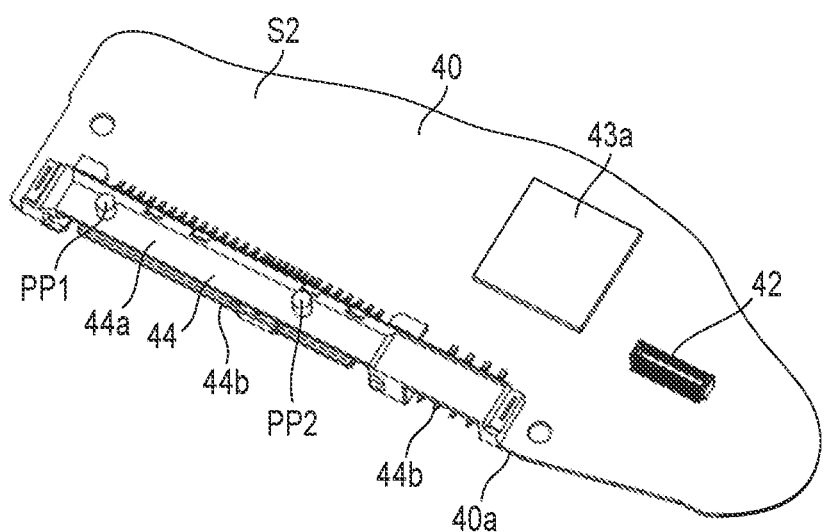
FIG. 5 is a perspective view illustrating an interface connector mounting portion of the control circuit board.

FIG. 5 is a perspective view illustrating an interface connector mounting portion of the printed circuit board.

As described above, the interface connector 44 is fixed to the inner surface S2 of the printed circuit board 40. The case 44a of the interface connector 44 integrally includes the first positioning pin PP1 and the second positioning pin PP2 as board-side positioning portions. The first positioning pin PP1 and the second positioning pin PP2 are provided to be separated from each other in the longitudinal direction of the end side 40a, and extend in a direction substantially perpendicular to the inner surface S2 of the printed circuit board 40. The first positioning pin PP1 and the second positioning pin PP2 are provided at positions fittable to the first positioning hole PT1 and the second positioning hole PT2, and are formed in shapes and sizes fittable to the first positioning hole PT1 and the second positioning hole PT2.

As illustrated in FIGS. 2 and 4, the printed circuit board 40 having the above configuration is placed at a predetermined position on the bottom wall 12a in a state where the inner surface S2 faces the base 12, and is screwed to the bottom wall 12a by a plurality of fixing screws M1. Each fixing screw M1 is screwed into the screw hole 47 of the boss 46 through the through hole of the printed circuit board 40. The relay connector 42 is fitted to the first relay connector 51 of the relay connector unit 52. In addition, the connector terminal portion 43c is connected to one end portion of the connection FPC 30. The interface connector 44 is positioned within the recess 48 of the base 12.

Figure 6:
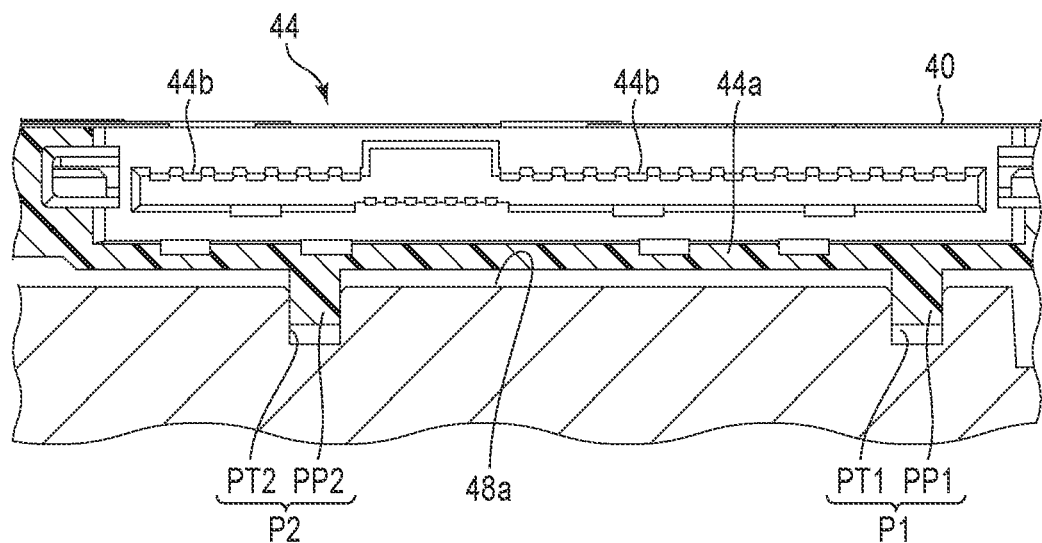
FIG. 6 is a cross-sectional view of positioning portions of a housing and the control circuit board taken along line A-A in FIG. 2.
Figure 7:
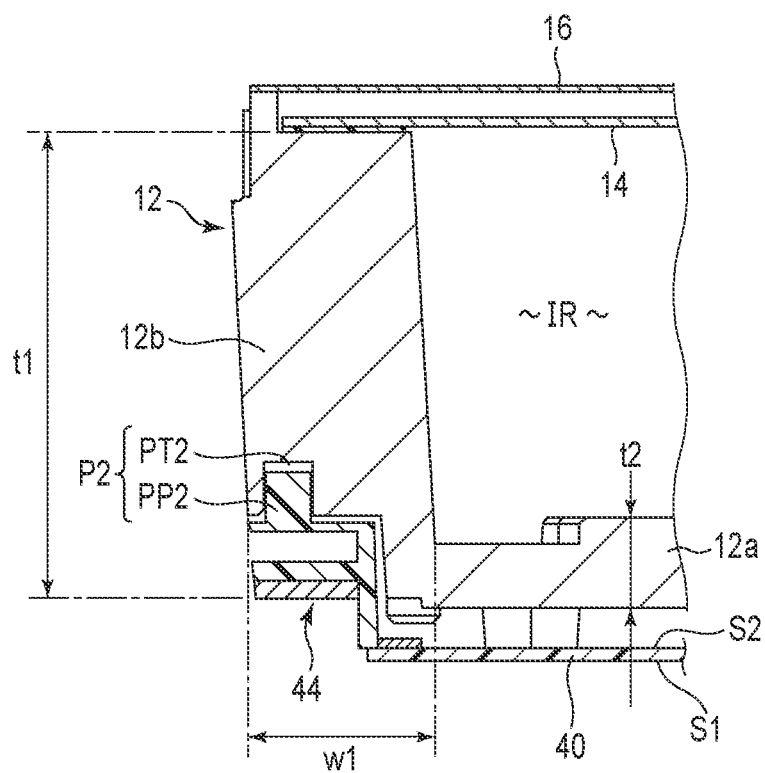
FIG. 7 is a cross-sectional view of the positioning portion side of the housing taken along line B-B in FIG. 2.

FIG. 6 is a cross-sectional view of the housing and the positioning portion of the printed circuit board taken along line A-A in FIG. 2, and FIG. 7 is a cross-sectional view of the housing taken along line B-B in FIG. 2.

As illustrated in the drawings, the interface connector 44 is positioned within the recess 48 of the base 12 and faces substantially parallel with the bottom surface 48a. The first positioning pin PP1 and the second positioning pin PP2 are fitted into the first positioning hole PT1 and the second positioning hole PT2, respectively. As a result, the printed circuit board 40 is positioned at a predetermined position with respect to the base 12.

The first positioning pin PP1 and the first positioning hole PT1 are fitted to each other to configure a first positioning portion P1 for positioning the printed circuit board 40 with respect to the base 12. Similarly, the second positioning pin PP2 and the second positioning hole PT2 are fitted to each other to configure a second positioning portion P2 for positioning the printed circuit board 40 with respect to the base 12.

As illustrated in FIG. 7, the first positioning portion P1 and the second positioning portion P2 are provided to face a region W1 overlapping the side wall 12b in the bottom wall 12a of the base 12. When a direction orthogonal to the bottom wall 12a is the thickness direction of the housing 10, the first positioning portion P1 and the second positioning portion P2 are provided in a region not overlapping an internal space IR of the housing 10 in the thickness direction. Therefore, a thickness (second thickness) t1 of the housing in a region (second portion) where the first positioning portion P1 and the second positioning portion P2 are provided is thicker than a thickness (first thickness) t2 of at least a part (first portion) of the bottom wall 12a.

As described above, the printed circuit board 40 is screwed and fixed to the base 12 with the fixing screw M1 in the state of being positioned at a predetermined position with respect to the base 12 by two positioning portions P1 and P2.

According to the HDD configured as described above, the first positioning portion P1 and the second positioning portion P2 for positioning the printed circuit board 40 are provided in a region not overlapping the internal space IR of the housing 10 in the direction orthogonal to the bottom wall 12a, that is, in a region overlapping the side wall 12b in the bottom wall 12a. Therefore, it is not necessary to provide a positioning pin or a positioning hole in a region of the bottom wall 12a where a wall thickness is relatively thin, and the occurrence of gas leakage in the bottom wall 12a can be suppressed. As a result, the airtightness of the base 12 can be maintained high, and the reliability of the HDD can be improved. Further, since the relay connector unit 52 and the relay connector 42 are not used as positioning references, it is possible to relax processing accuracy of the relay connector unit 52 and the base 12. Therefore, the manufacturability of the HDD including the base 12 is improved.

As described above, according to the first embodiment, it is possible to provide a disk device capable of improving an assembly accuracy while maintaining the airtightness of the housing.

Next, an HDD according to another embodiment will be described. Note that in other embodiments described below, the same portions as those in the first embodiment described above are designated by the same reference numerals, and detailed description thereof will be simplified or omitted. Portions different from those in the first embodiment will be mainly described in detail.

It is sufficient if one of the positioning pin and the positioning hole configuring the positioning portion is provided on the side of the printed circuit board 40, and the other is provided on the side of the base 12.

Second Embodiment

Figure 8:
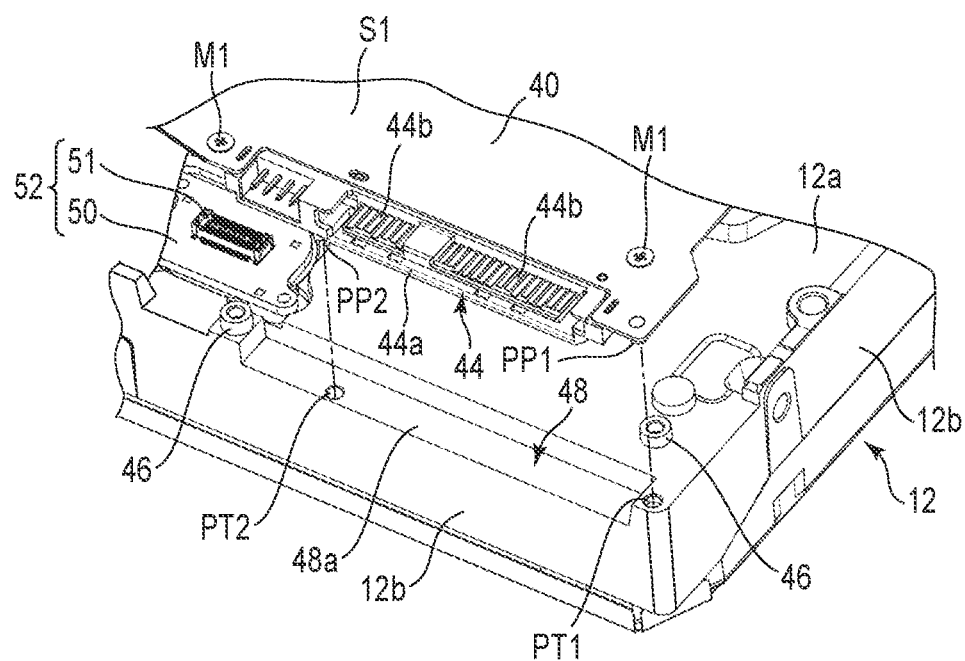
FIG. 8 is an exploded perspective view illustrating a back surface side of a base and a control circuit board in the HDD according to a second embodiment.
Figure 9:
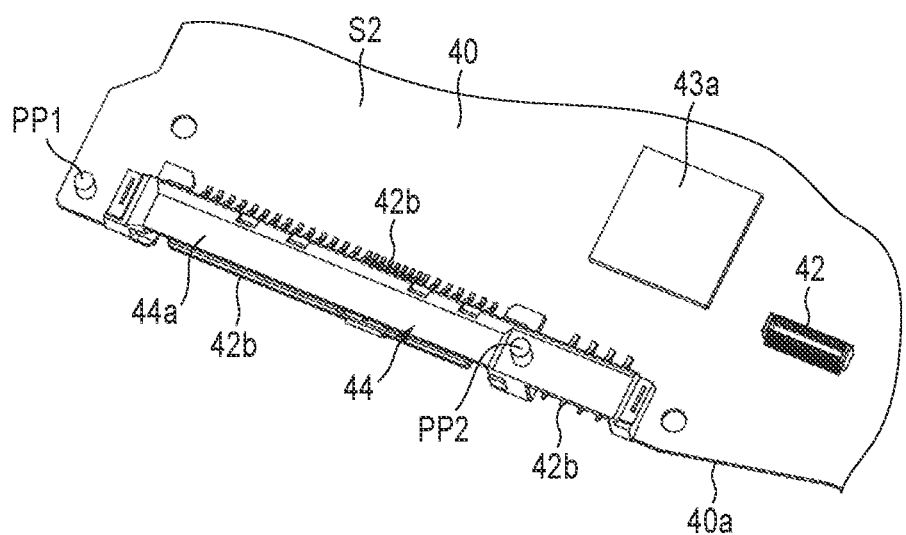
FIG. 9 is a perspective view illustrating an interface connector mounting portion of the control circuit board in the HDD according to the second embodiment.
Figure 10:
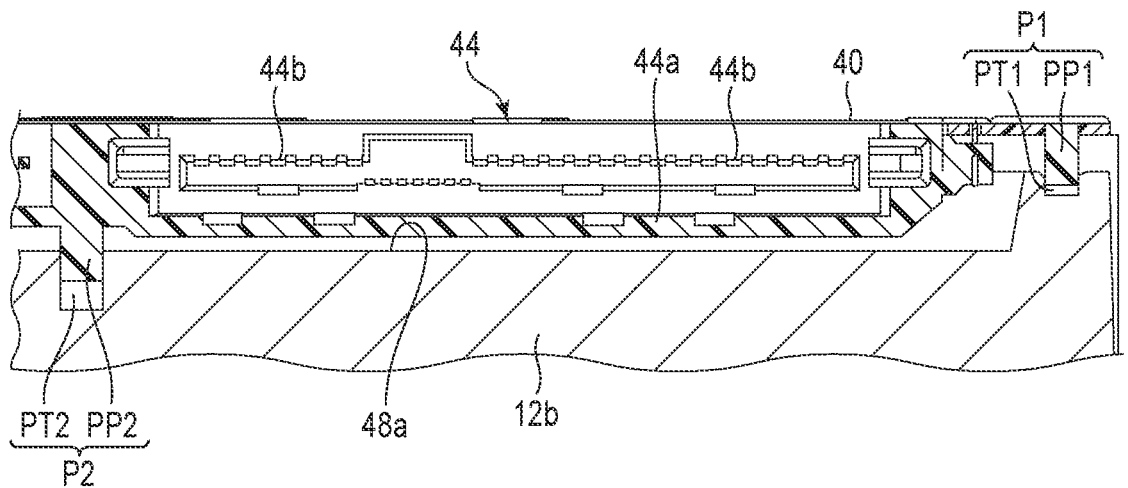
FIG. 10 is a cross-sectional view of positioning portions of a housing and the control circuit board in the HDD according to the second embodiment.

FIG. 8 is an exploded perspective view illustrating the back surface side of the base of the HDD and the control circuit board according to a second embodiment, FIG. 9 is a perspective view illustrating the interface connector mounting portion of the control circuit board, and FIG. 10 is a cross-sectional view of the positioning portions of the base and the control circuit board in the HDD according to the second embodiment.

As illustrated in the drawings, the HDD includes a first positioning portion P1 and a second positioning portion P2 for positioning a printed circuit board 40 with respect to the housing 10. In the second embodiment, a first positioning pin PP1 (board-side positioning portion) of the first positioning portion P1 is provided on a printed circuit board 40 itself, and is positioned between one side edge of the printed circuit board 40 and an interface connector 44. The first positioning pin PP1 protrudes substantially vertically from an inner surface S2 of the printed circuit board 40. A first positioning hole PT1 (base-side positioning portion) is provided in the region overlapping a side wall 12b in a bottom wall 12a of a base 12, here, at a corner portion of the bottom wall 12a.

A second positioning pin PP2 (board-side positioning portion) of the second positioning portion P2 is provided integrally with a case 44a of the interface connector 44. The second positioning pin PP2 protrudes substantially vertically with respect to the inner surface S2 of the printed circuit board 40. A second positioning hole PT2 (base-side positioning portion) is provided in a region overlapping the side wall 12b, here, a bottom surface 48a of a recess 48 formed in the bottom wall 12a.

As illustrated in FIG. 10, the first positioning pin PP1 of the first positioning portion P1 is fitted into the first positioning hole PT1, and the second positioning pin PP2 of the second positioning portion P2 is fitted into the second positioning hole PT2, whereby the printed circuit board 40 is positioned with respect to the base 12 at two positions of the first positioning portion P1 and the second positioning portion P2. The thickness of the housing in the region where the first positioning portion P1 and the second positioning portion P2 are provided is larger than the thickness of at least a part of the bottom wall 12a. In the second embodiment, the other configurations of the HDD are the same as those of the HDD according to the first embodiment.

Third Embodiment

Figure 11:
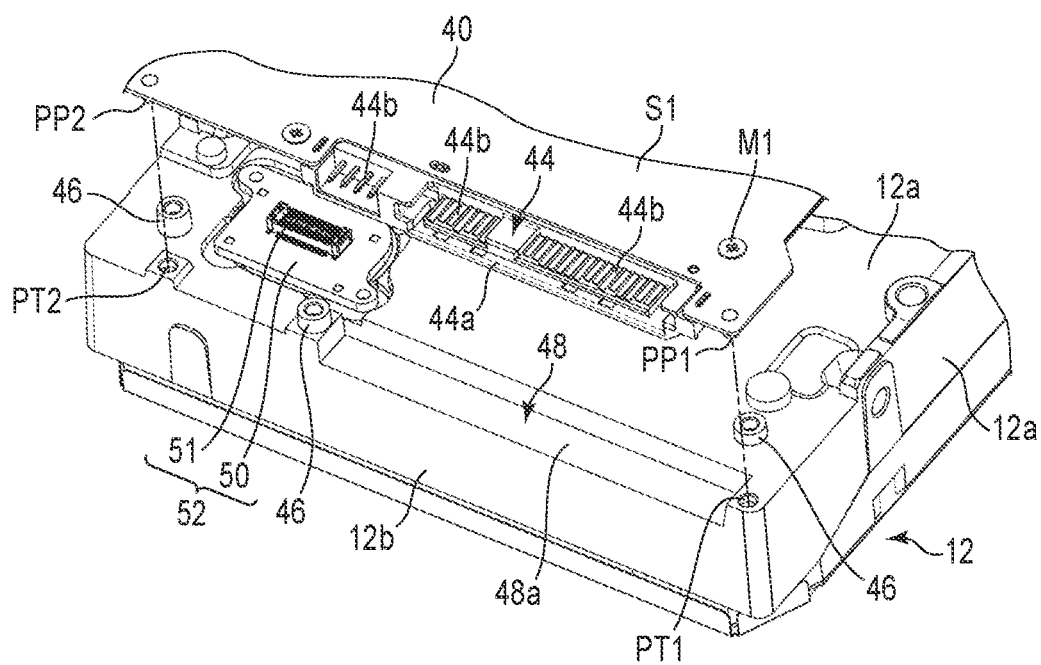
FIG. 11 is an exploded perspective view illustrating a back surface side of a base and a control circuit board in the HDD according to a third embodiment.
Figure 12:
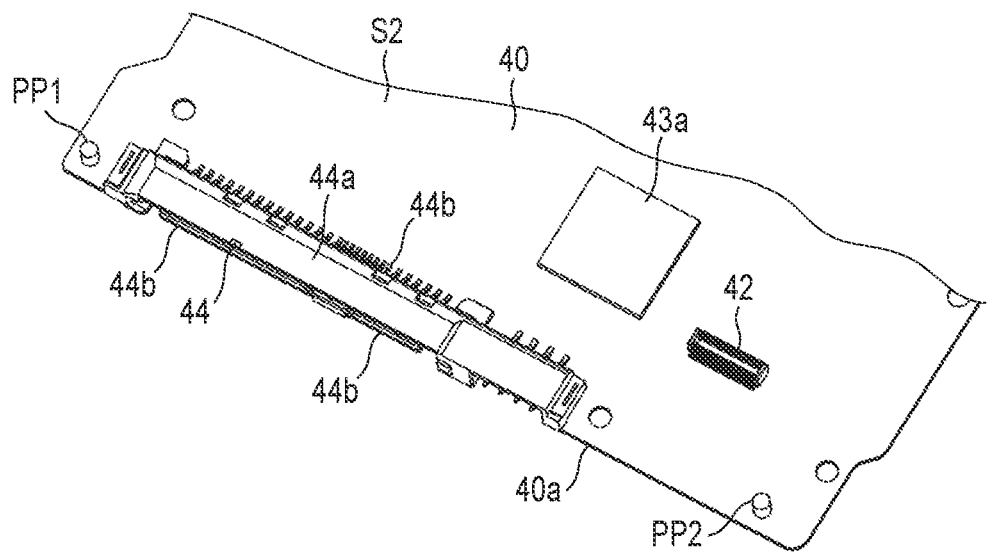
FIG. 12 is a perspective view illustrating an interface connector mounting portion of the control circuit board in the HDD according to the third embodiment.
Figure 13:
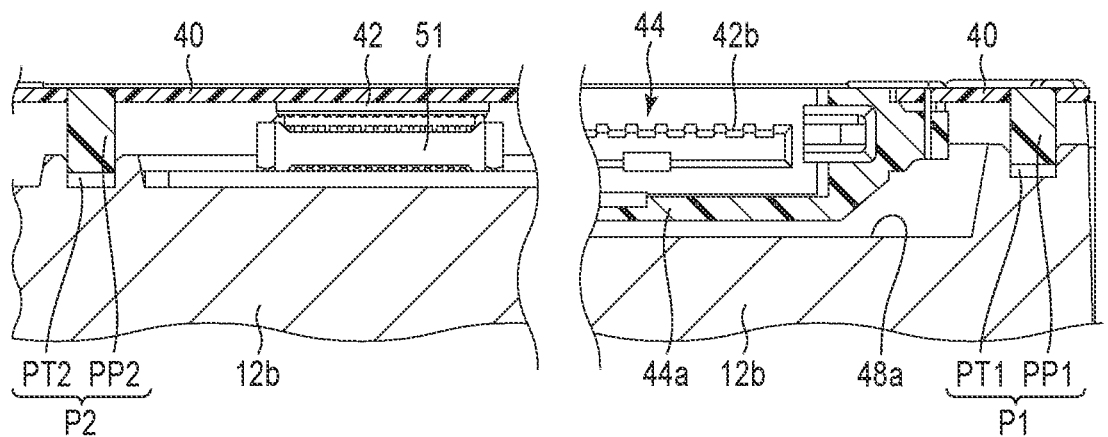
FIG. 13 is a cross-sectional view of positioning portions of a housing and the control circuit board in the HDD according to the third embodiment.

FIG. 11 is an exploded perspective view illustrating the back surface side of the base of the HDD and the control circuit board according to a third embodiment, FIG. 12 is a perspective view illustrating the interface connector mounting portion of the control circuit board, and FIG. 13 is a cross-sectional view of the positioning portion of the base and the control circuit board in the HDD according to the third embodiment.

As illustrated in the drawings, in the third embodiment, a first positioning pin PP1 (board-side positioning portion) of a first positioning portion P1 is provided on a printed circuit board 40 itself, and is positioned between one side edge of a printed circuit board 40 and an interface connector 44. The first positioning pin PP1 protrudes substantially vertically from an inner surface S2 of the printed circuit board 40. A first positioning hole PT1 (base-side positioning portion) is provided in the region overlapping a side wall 12b in a bottom wall 12a of a base 12, here, at a corner portion of the bottom wall 12a.

The second positioning pin PP2 (board-side positioning portion) of a second positioning portion P2 is provided on the printed circuit board 40 itself, and is positioned between the other side edge of the printed circuit board 40 and the interface connector 44. The second positioning pin PP2 protrudes substantially vertically from the inner surface S2 of the printed circuit board 40. A second positioning hole PT2 (base-side positioning portion) is provided in the region overlapping a side wall 12b in a bottom wall 12a of a base 12, here, in the vicinity of the corner portion of the bottom wall 12a.

As illustrated in FIG. 11, the first positioning pin PP1 of the first positioning portion P1 is fitted into the first positioning hole PT1, and the second positioning pin PP2 of the second positioning portion P2 is fitted into the second positioning hole PT2, whereby the printed circuit board 40 is positioned with respect to the base 12 at two positions of the first positioning portion P1 and the second positioning portion P2. The thickness of the housing in the region where the first positioning portion P1 and the second positioning portion P2 are provided is larger than the thickness of at least a part of the bottom wall 12a. In the third embodiment, the other configurations of the HDD are the same as those of the HDD according to the first embodiment.

Fourth Embodiment

Figure 16:
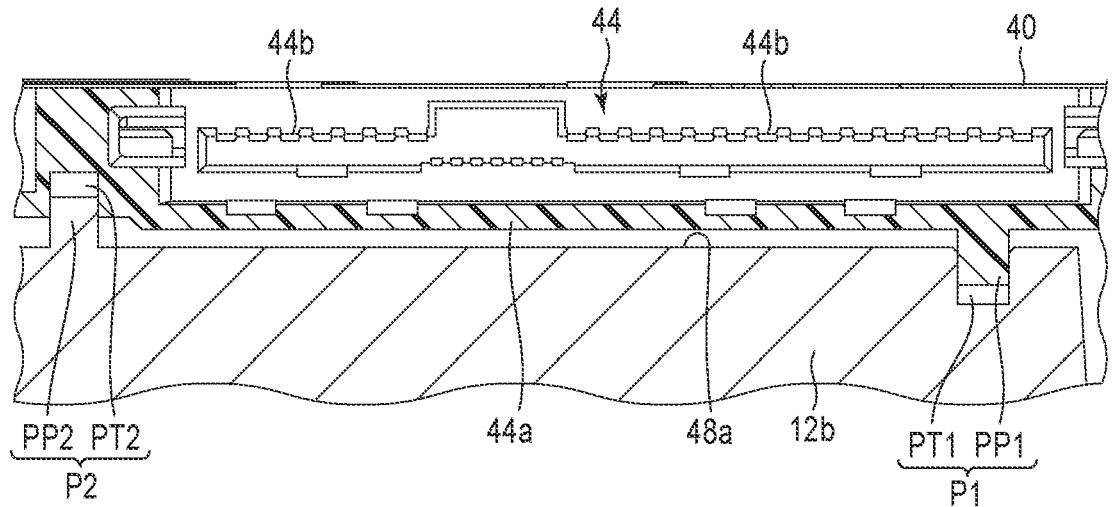
FIG. 16 is a cross-sectional view of positioning portions of a housing and the control circuit board in the HDD according to the fourth embodiment.

FIG. 14 is an exploded perspective view illustrating the back surface side of the base of the HDD and the control circuit board according to a fourth embodiment, FIG. 15 is a perspective view illustrating the interface connector mounting portion of the control circuit board, and FIG. 16 is a cross-sectional view of the positioning portion of the base and the control circuit board in the HDD according to the fourth embodiment.

As illustrated in the drawings, in the fourth embodiment, a first positioning pin PP1 (board-side positioning portion) of a first positioning portion P1 is provided integrally with a case 44a of an interface connector 44. The first positioning pin PP1 protrudes substantially vertically with respect to an inner surface S2 of a printed circuit board 40. A first positioning hole PT1 (base-side positioning portion) is provided in the region overlapping a side wall 12b in a bottom wall 12a of a base 12, here, a bottom surface 48a of a recess 48 formed in the bottom wall 12a.

A second positioning pin PP2 (base-side positioning portion) of a second positioning portion P2 is provided to protrude from the region overlapping the side wall 12b, here, the bottom surface 48a of the recess 48 formed in the bottom wall 12a. The second positioning pin PP2 protrudes vertically with respect to the outer surface of the bottom wall 12a. A second positioning hole PT2 (board-side positioning portion) is provided in the region overlapping the side wall 12b, here, the case 44a of the interface connector 44.

As illustrated in FIG. 16, the first positioning pin PP1 of the first positioning portion P1 is fitted into the first positioning hole PT1, and the second positioning pin PP2 of the second positioning portion P2 is fitted into the second positioning hole PT2, whereby the printed circuit board 40 is positioned with respect to the base 12 at two positions of the first positioning portion P1 and the second positioning portion P2. The thickness of the housing in the region where the first positioning portion P1 and the second positioning portion P2 are provided is larger than the thickness of at least a part of the bottom wall 12a. In the fourth embodiment, the other configurations of the HDD are the same as those of the HDD according to the first embodiment.

Fifth Embodiment

Figure 17:
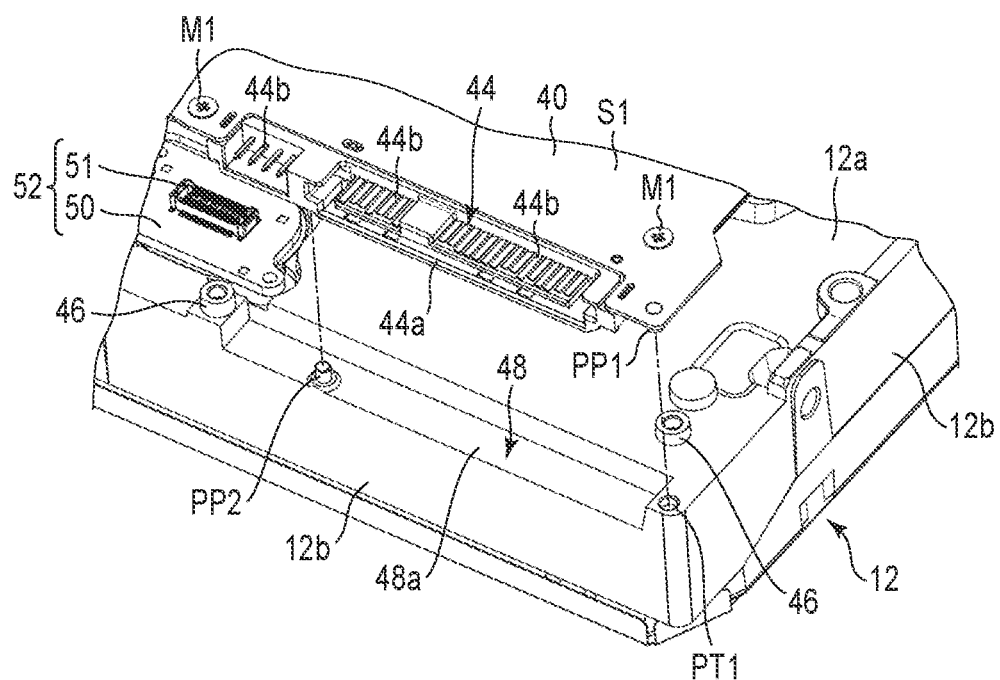
FIG. 17 is an exploded perspective view illustrating a back surface side of a base and a control circuit board in the HDD according to the fifth embodiment.
Figure 18:
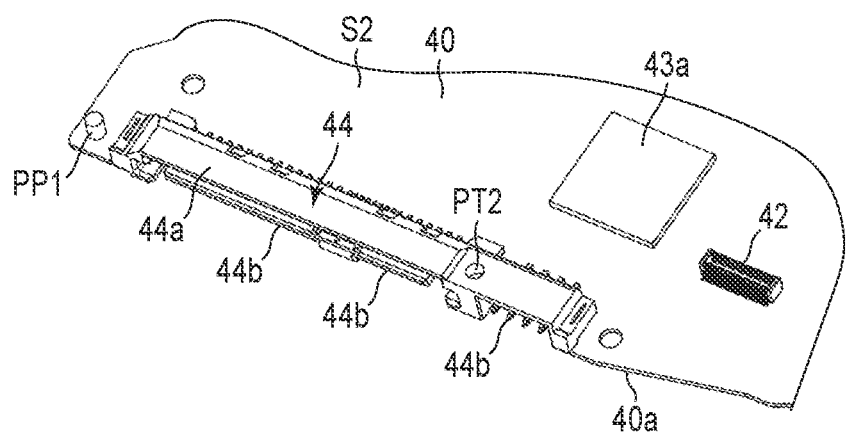
FIG. 18 is a perspective view illustrating an interface connector mounting portion of the control circuit board in the HDD according to the fifth embodiment.
Figure 19:
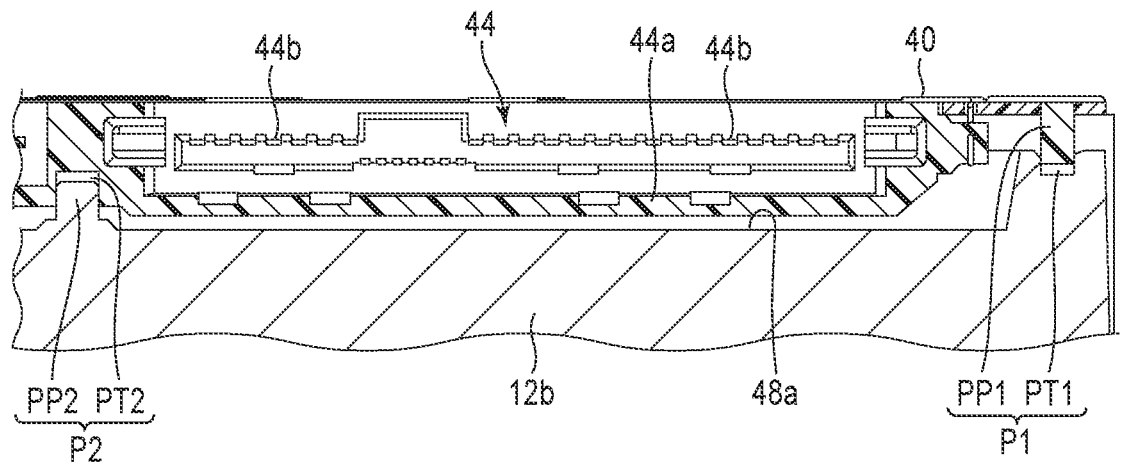
FIG. 19 is a cross-sectional view of positioning portions of a housing and the control circuit board in the HDD according to the fifth embodiment.

FIG. 17 is an exploded perspective view illustrating the back surface side of the base of the HDD and the control circuit board according to a fifth embodiment, FIG. 18 is a perspective view illustrating the interface connector mounting portion of the control circuit board, and FIG. 19 is a cross-sectional view of the positioning portion of the base and the control circuit board in the HDD according to the fifth embodiment.

As illustrated in the drawings, in the fifth embodiment, a first positioning pin PP1 of a first positioning portion P1 is provided on a printed circuit board 40 itself, and is positioned between one side edge of the printed circuit board 40 and an interface connector 44. The first positioning pin PP1 protrudes substantially vertically from an inner surface S2 of the printed circuit board 40. A first positioning hole PT1 is provided in the region overlapping a side wall 12b in a bottom wall 12a of a base 12, here, at the corner portion of the bottom wall 12a.

A second positioning pin PP2 of a second positioning portion P2 is provided to protrude from the region overlapping the side wall 12b, here, a bottom surface 48a of a recess 48 formed in the bottom wall 12a. The second positioning pin PP2 protrudes vertically with respect to the outer surface of the bottom wall 12a. A second positioning hole PT2 is provided in the region overlapping the side wall 12b, here, a case 44a of the interface connector 44.

As illustrated in FIG. 19, the first positioning pin PP1 of the first positioning portion P1 is fitted into the first positioning hole PT1, and the second positioning pin PP2 of the second positioning portion P2 is fitted into the second positioning hole PT2, whereby the printed circuit board 40 is positioned with respect to the base 12 at two positions of the first positioning portion P1 and the second positioning portion P2. The thickness of the housing in the region where the first positioning portion P1 and the second positioning portion P2 are provided is larger than the thickness of at least a part of the bottom wall 12a. In the fifth embodiment, the other configurations of the HDD are the same as those of the HDD according to the first embodiment.

Sixth Embodiment

Figure 20:
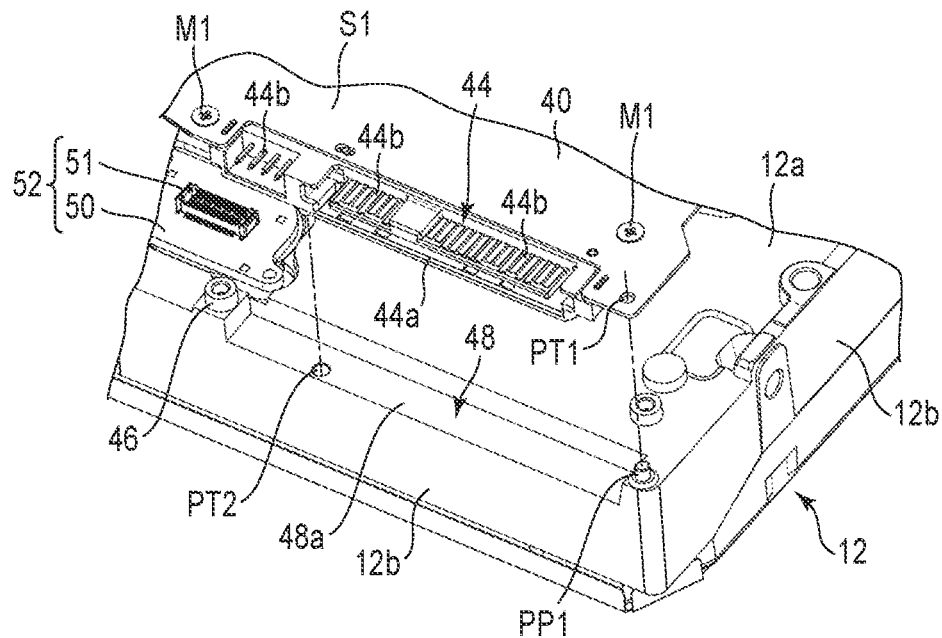
FIG. 20 is an exploded perspective view illustrating a back surface side of a base and a control circuit board in the HDD according to a sixth embodiment.
Figure 21:
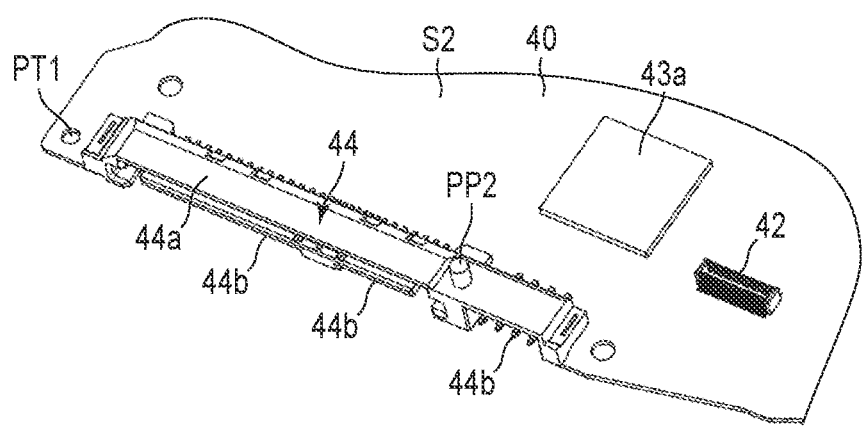
FIG. 21 is a perspective view illustrating an interface connector mounting portion of the control circuit board in the HDD according to the sixth embodiment.
Figure 22:
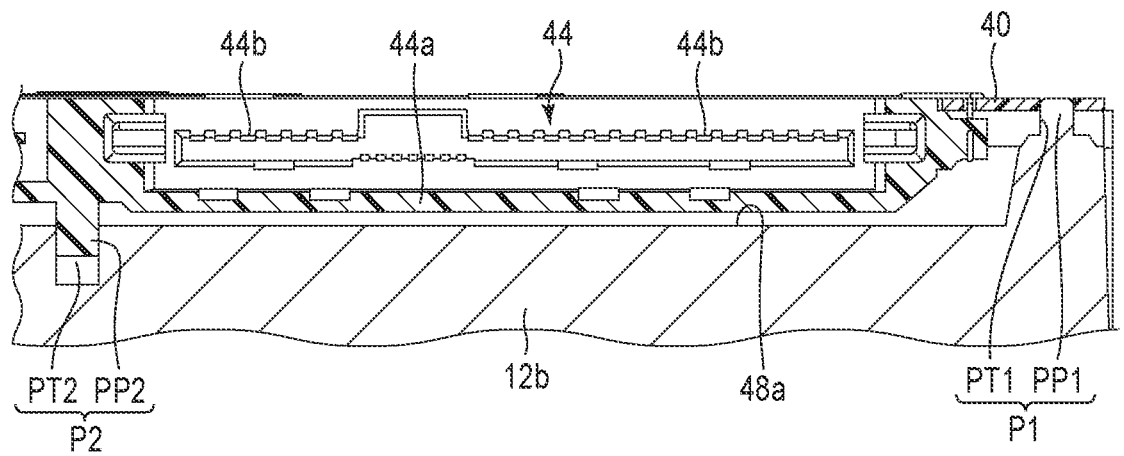
FIG. 22 is a cross-sectional view of positioning portions of a housing and the control circuit board in the HDD according to the sixth embodiment.

FIG. 20 is an exploded perspective view illustrating the back surface side of the base of the HDD and the control circuit board according to a sixth embodiment, FIG. 21 is a perspective view illustrating the interface connector mounting portion of the control circuit board, and FIG. 22 is a cross-sectional view of the positioning portion of the base and the control circuit board in the HDD according to the sixth embodiment.

As illustrated in the drawings, in the sixth embodiment, a first positioning pin PP1 (base-side positioning portion) of a first positioning portion P1 is provided in the region overlapping a side wall 12b in a bottom wall 12a of a base 12, here, at the corner portion of the bottom wall 12a. The first positioning pin PP1 protrudes substantially vertically from the bottom wall 12a. A first positioning hole PT1 (board-side positioning portion) is provided in a printed circuit board 40 itself, and is positioned between one side edge of the printed circuit board 40 and an interface connector 44.

A second positioning pin PP2 (board-side positioning portion) of the second positioning portion P2 is provided integrally with a case 44a of the interface connector 44. The second positioning pin PP2 protrudes substantially vertically with respect to the inner surface S2 of the printed circuit board 40. A second positioning hole PT2 (base-side positioning portion) is provided in a region overlapping the side wall 12b, here, a bottom surface 48a of a recess 48 formed in the bottom wall 12a.

As illustrated in FIG. 22, the first positioning pin PP1 of the first positioning portion P1 is fitted into the first positioning hole PT1, and the second positioning pin PP2 of the second positioning portion P2 is fitted into the second positioning hole PT2, whereby the printed circuit board 40 is positioned with respect to the base 12 at two positions of the first positioning portion P1 and the second positioning portion P2. The thickness of the housing in the region where the first positioning portion P1 and the second positioning portion P2 are provided is larger than the thickness of at least a part of the bottom wall 12a. In the sixth embodiment, the other configurations of the HDD are the same as those of the HDD according to the first embodiment.

Seventh Embodiment

Figure 23:
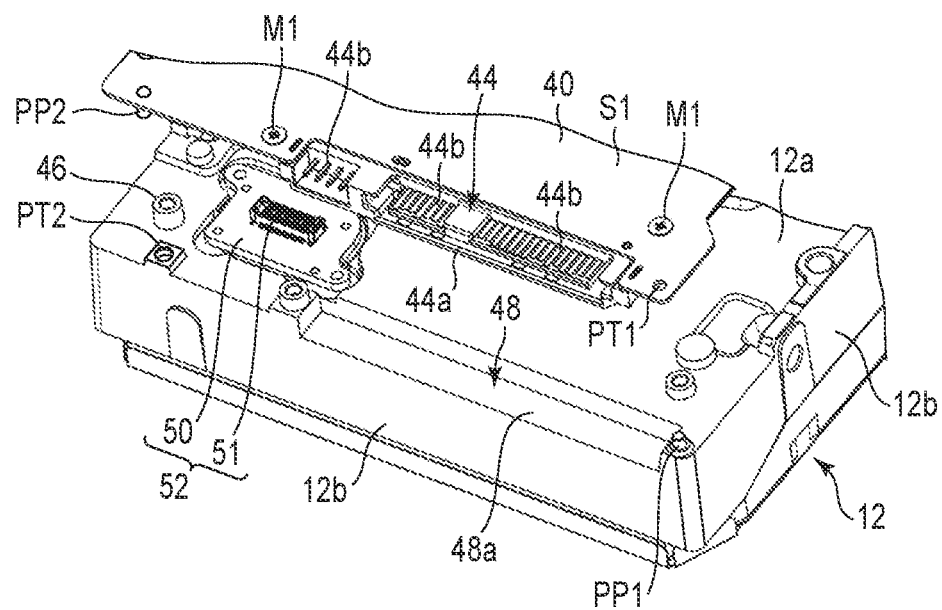
FIG. 23 is an exploded perspective view illustrating a back surface side of a base and a control circuit board in the HDD according to a seventh embodiment.
Figure 24:
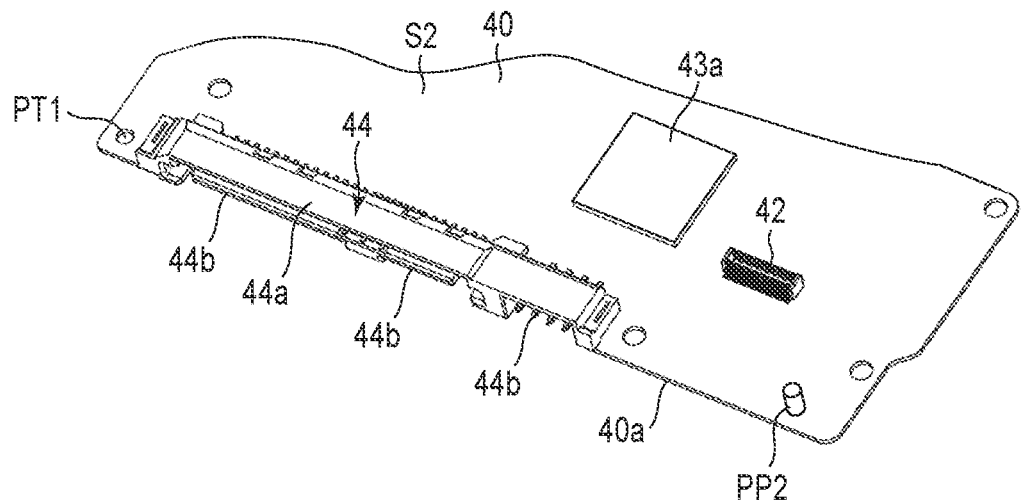
FIG. 24 is a perspective view illustrating an interface connector mounting portion of the control circuit board in the HDD according to the seventh embodiment.
Figure 25:
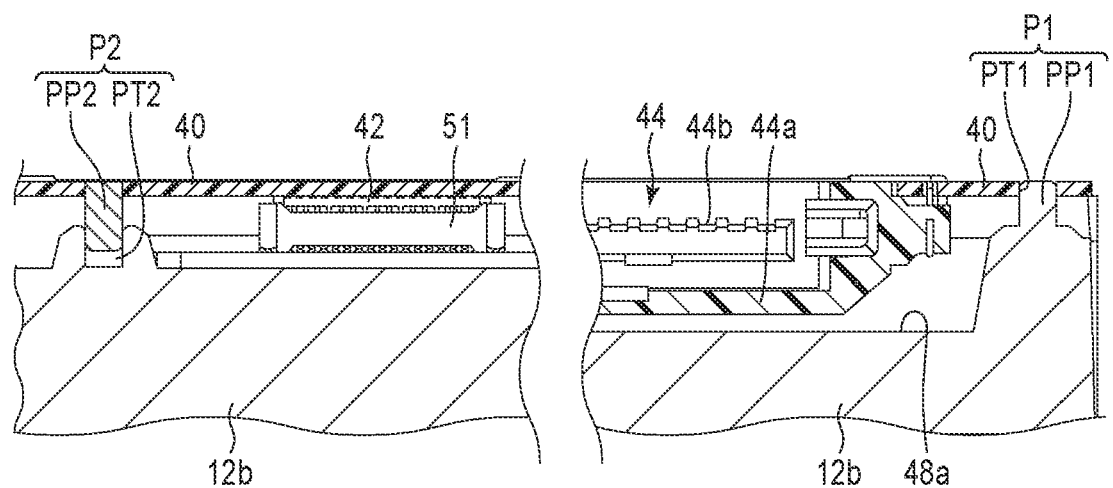
FIG. 25 is a cross-sectional view of positioning portions of a housing and the control circuit board in the HDD according to the seventh embodiment.

FIG. 23 is an exploded perspective view illustrating the back surface side of the base of the HDD and the control circuit board according to a seventh embodiment, FIG. 24 is a perspective view illustrating the interface connector mounting portion of the control circuit board, and FIG. 25 is a cross-sectional view of the positioning portion of the base and the control circuit board in the HDD according to the eighth embodiment.

As illustrated in the drawings, in the seventh embodiment, a first positioning pin PP1 of a first positioning portion P1 is provided in the region overlapping a side wall 12b in a bottom wall 12a of a base 12, here, at the corner portion of the bottom wall 12a. The first positioning pin PP1 protrudes substantially vertically from the bottom wall 12a. A first positioning hole PT1 is provided in a printed circuit board 40 and is positioned between one side edge of the printed circuit board 40 and an interface connector 44.

A second positioning hole PT2 of a second positioning portion P2 is provided in the region overlapping the side wall 12b, here, in the vicinity of the other corner portion of the bottom wall 12a. The second positioning hole PT2 is provided in the printed circuit board 40 and is positioned between the other side edge of the printed circuit board 40 and the interface connector 44. A second positioning pin PP2 protrudes substantially vertically from the printed circuit board 40.

As illustrated in FIG. 25, the first positioning pin PP1 of the first positioning portion P1 is fitted into the first positioning hole PT1, and the second positioning pin PP2 of the second positioning portion P2 is fitted into the second positioning hole PT2, whereby the printed circuit board 40 is positioned with respect to the base 12 at two positions of the first positioning portion P1 and the second positioning portion P2. The thickness of the housing in the region where the first positioning portion P1 and the second positioning portion P2 are provided is larger than the thickness of at least a part of the bottom wall 12a. In the seventh embodiment, the other configurations of the HDD are the same as those of the HDD according to the first embodiment.

Eighth Embodiment

Figure 28:
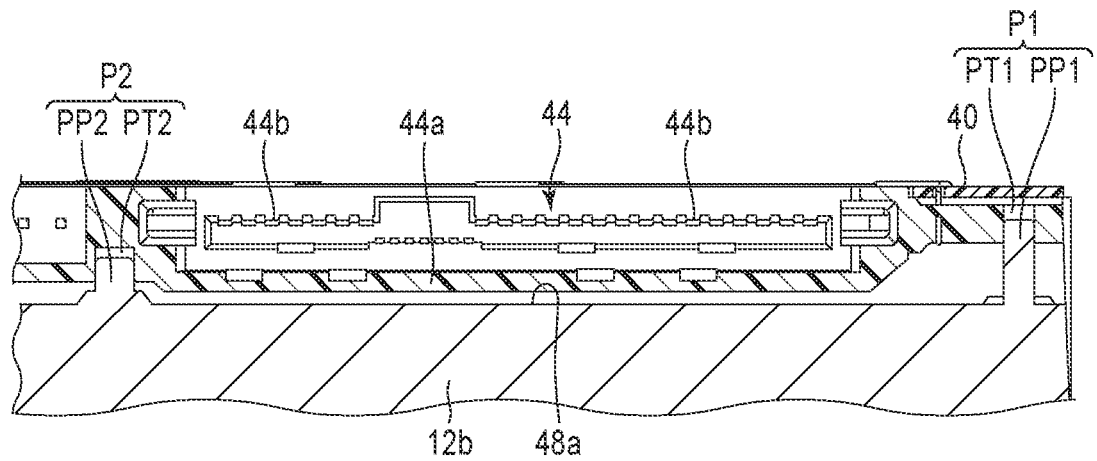
FIG. 28 is a cross-sectional view of positioning portions of a housing and the control circuit board in the HDD according to the eighth embodiment.

FIG. 26 is an exploded perspective view illustrating the back surface side of the base of the HDD and the control circuit board according to an eighth embodiment, FIG. 27 is a perspective view illustrating the interface connector mounting portion of the control circuit board, and FIG. 28 is a cross-sectional view of the positioning portion of the base and the control circuit board in the HDD according to the eighth embodiment.

As illustrated in the drawing, in the eighth embodiment, both a first positioning pin PP1 and a second positioning pin PP2 are provided on a base 12, and both the first positioning hole PT1 and the second positioning hole PT2 are provided on the side of a printed circuit board 40.

The first positioning pin PP1 of the first positioning portion P1 is provided in the region overlapping a side wall 12b in a bottom wall 12a of the base 12, here, at the corner portion of the bottom wall 12a. The first positioning pin PP1 protrudes substantially vertically from the bottom wall 12a. The first positioning hole PT1 is provided in a case 44a of an interface connector 44 in the vicinity of one side edge of the printed circuit board 40.

The second positioning pin PP2 of the second positioning portion P2 is provided in the region overlapping the side wall 12b, here, a bottom surface 48a of a recess 48 formed in the bottom wall 12a. The second positioning pin PP2 protrudes substantially vertically from the bottom surface 48a. The second positioning hole PT2 is provided in the case 44a of the interface connector 44.

As illustrated in FIG. 28, the first positioning pin PP1 of the first positioning portion P1 is fitted into the first positioning hole PT1, and the second positioning pin PP2 of the second positioning portion P2 is fitted into the second positioning hole PT2, whereby the printed circuit board 40 is positioned with respect to the base 12 at two positions of the first positioning portion P1 and the second positioning portion P2. The thickness of the housing in the region where the first positioning portion P1 and the second positioning portion P2 are provided is larger than the thickness of at least a part of the bottom wall 12a. In the eighth embodiment, the other configurations of the HDD are the same as those of the HDD according to the first embodiment.

Ninth Embodiment

Figure 29:
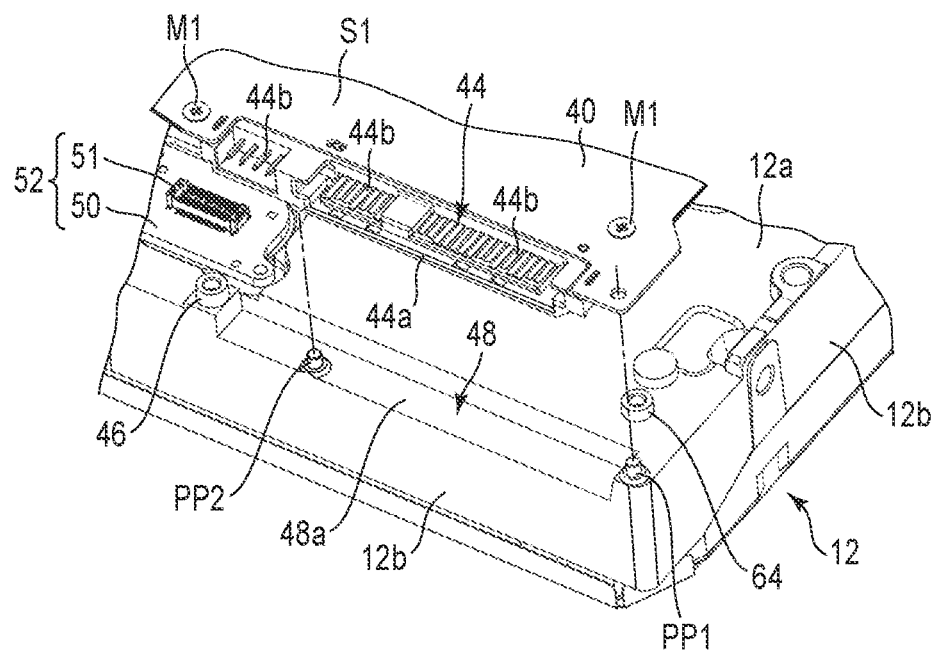
FIG. 29 is an exploded perspective view illustrating a back surface side of a base and a control circuit board in the HDD according to a ninth embodiment.

FIG. 29 is an exploded perspective view illustrating the back surface side of the base of the HDD and the control circuit board according to a ninth embodiment, FIG. 30 is a perspective view illustrating the interface connector mounting portion of the control circuit board, and FIG. 31 is a cross-sectional view of a positioning portion of the base and the control circuit board in the HDD according to the ninth embodiment.

As illustrated in the drawing, in the ninth embodiment, both a first positioning pin PP1 and a second positioning pin PP2 are provided on a base 12, and both a first positioning hole PT1 and a second positioning hole PT2 are provided on the side of a printed circuit board 40.

The first positioning pin PP1 of the first positioning portion P1 is provided in the region overlapping a side wall 12b in a bottom wall 12a of the base 12, here, at the corner portion of the bottom wall 12a. The first positioning pin PP1 protrudes substantially vertically from the bottom wall 12a. A first positioning hole PT1 is provided in a printed circuit board 40 and is positioned between one side edge of the printed circuit board 40 and an interface connector 44.

The second positioning pin PP2 of the second positioning portion P2 is provided in the region overlapping the side wall 12b, here, a bottom surface 48a of a recess 48 formed in the bottom wall 12a. The second positioning pin PP2 protrudes substantially vertically from the bottom surface 48a. The second positioning hole PT2 is provided in the case 44a of the interface connector 44.

As illustrated in FIG. 31, the first positioning pin PP1 of the first positioning portion P1 is fitted into the first positioning hole PT1, and the second positioning pin PP2 of the second positioning portion P2 is fitted into the second positioning hole PT2, whereby the printed circuit board 40 is positioned with respect to the base 12 at two positions of the first positioning portion P1 and the second positioning portion P2. The thickness of the housing in the region where the first positioning portion P1 and the second positioning portion P2 are provided is larger than the thickness of at least a part of the bottom wall 12a. In the ninth embodiment, the other configurations of the HDD are the same as those of the HDD according to the first embodiment.

Tenth Embodiment

FIG. 32 is an exploded perspective view illustrating the back surface side of the base of the HDD and the control circuit board according to a tenth embodiment, FIG. 31 is a perspective view illustrating the interface connector mounting portion of the control circuit board, and FIG. 32 is a cross-sectional view of a positioning portion of the base and the control circuit board in the HDD according to the tenth embodiment.

As illustrated in the drawings, in the tenth embodiment, a first positioning pin PP1 of a first positioning portion P1 is provided in the region overlapping a side wall 12b in a bottom wall 12a of a base 12, here, at a corner portion of the bottom wall 12a. The first positioning pin PP1 protrudes substantially vertically from the bottom wall 12a. A first positioning hole PT1 is provided in a printed circuit board 40 and is positioned between one side edge of the printed circuit board 40 and an interface connector 44.

A second positioning pin PP2 of a second positioning portion P2 is provided in the region overlapping the side wall 12b, here, in the vicinity of the other corner portion of the bottom wall 12a. The first positioning pin PP1 protrudes substantially vertically from the bottom wall 12a. The second positioning hole PT2 is provided in the printed circuit board 40 and is positioned between the other side edge of the printed circuit board 40 and the interface connector 44.

As illustrated in FIG. 34, the first positioning pin PP1 of the first positioning portion P1 is fitted into the first positioning hole PT1, and the second positioning pin PP2 of the second positioning portion P2 is fitted into the second positioning hole PT2, whereby a printed circuit board 40 is positioned with respect to the base 12 at two positions of the first positioning portion P1 and the second positioning portion P2. The thickness of the housing in the region where the first positioning portion P1 and the second positioning portion P2 are provided is larger than the thickness of at least a part of the bottom wall 12a. In the tenth embodiment, the other configurations of the HDD are the same as those of the HDD according to the first embodiment.

In any of the second to tenth embodiments described above, the operation and effect similar to those of the first embodiment described above can be obtained. That is, in any of the second to tenth embodiments, it is possible to obtain a disk device capable of improving the assembly accuracy while maintaining the airtightness of the housing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of the positioning portions is not limited to two of the first and second positioning portions, and three or more positioning portions may be provided as necessary. The shape and size of the positioning pin and the positioning hole are not limited to those of the illustrated embodiment, and other shapes and sizes can be appropriately selected.

What is claimed is:

1. A disk device comprising: a housing which comprises a base including a bottom wall and a side wall provided upright on a peripheral edge portion of the bottom wall, a lid body fixed to the side wall, and at least two base-side positioning portions provided on the bottom wall in a region overlapping the side wall, and in which a gas having a density lower than that of air is sealed; a plurality of magnetic disks provided in the housing; a motor which supports and rotates the magnetic disks; a plurality of heads which process data on the magnetic disks; and a printed circuit board attached to an outer surface of the bottom wall, configured to control operations of the motor and the heads, and mounted with a plurality of connectors and electronic components, the printed circuit board including at least two board-side positioning portions each engaged with the base-side positioning portion, wherein one of the base-side positioning portion and the board-side positioning portion includes a pin extending substantially perpendicular to the bottom wall, and another includes a hole into which the pin is fitted; and one of the two base-side positioning portions includes a pin integrally protruding from the bottom wall, and another includes a hole formed in the bottom wall, and one of the two board-side positioning portions includes a hole into which the pin is fitted, and another includes a pin integrally protruding from the printed circuit board and fitted into the hole.

2. The disk device of claim 1, wherein
the two base-side positioning portions each includes a pin protruding from the bottom wall, and the two board-side positioning portions each includes a hole into which the pin is fitted.

3. The disk device of claim 1, wherein
the two board-side positioning portions each includes a pin protruding from the printed circuit board, and the two base-side positioning portions each includes a hole into which the pin is fitted.

4. The disk device of claim 1, wherein
the printed circuit board comprises an interface connector including a case fixed to the printed circuit board and a plurality of terminals arranged in the case, and
at least one of the board-side positioning portions includes a pin protruding from the case.

5. The disk device of claim 1, wherein
the printed circuit board comprises an interface connector including a case fixed to the printed circuit board and a plurality of terminals arranged in the case, and
at least one of the board-side positioning portions includes a hole provided in the case.

6. A disk device comprising: a housing which comprises a base including a first portion having a first thickness, a second portion having a second thickness larger than the first thickness, and a pin or a hole provided in the second portion, and in which a gas having a density lower than that of air is sealed; a plurality of magnetic disks provided in the housing; and a printed circuit board attached to an outer surface of the base and including a hole or a pin engaged with the pin of the hole of the base; and the housing integrally includes the pin protruding from the second portion of the bottom wall, and the printed circuit board includes the hole into which the pin is fitted; and the housing includes the hole provided in the second portion of the bottom wall, and the pin integrally protruding from the printed circuit board fitted into the hole.

* * * * *